(No Model.)

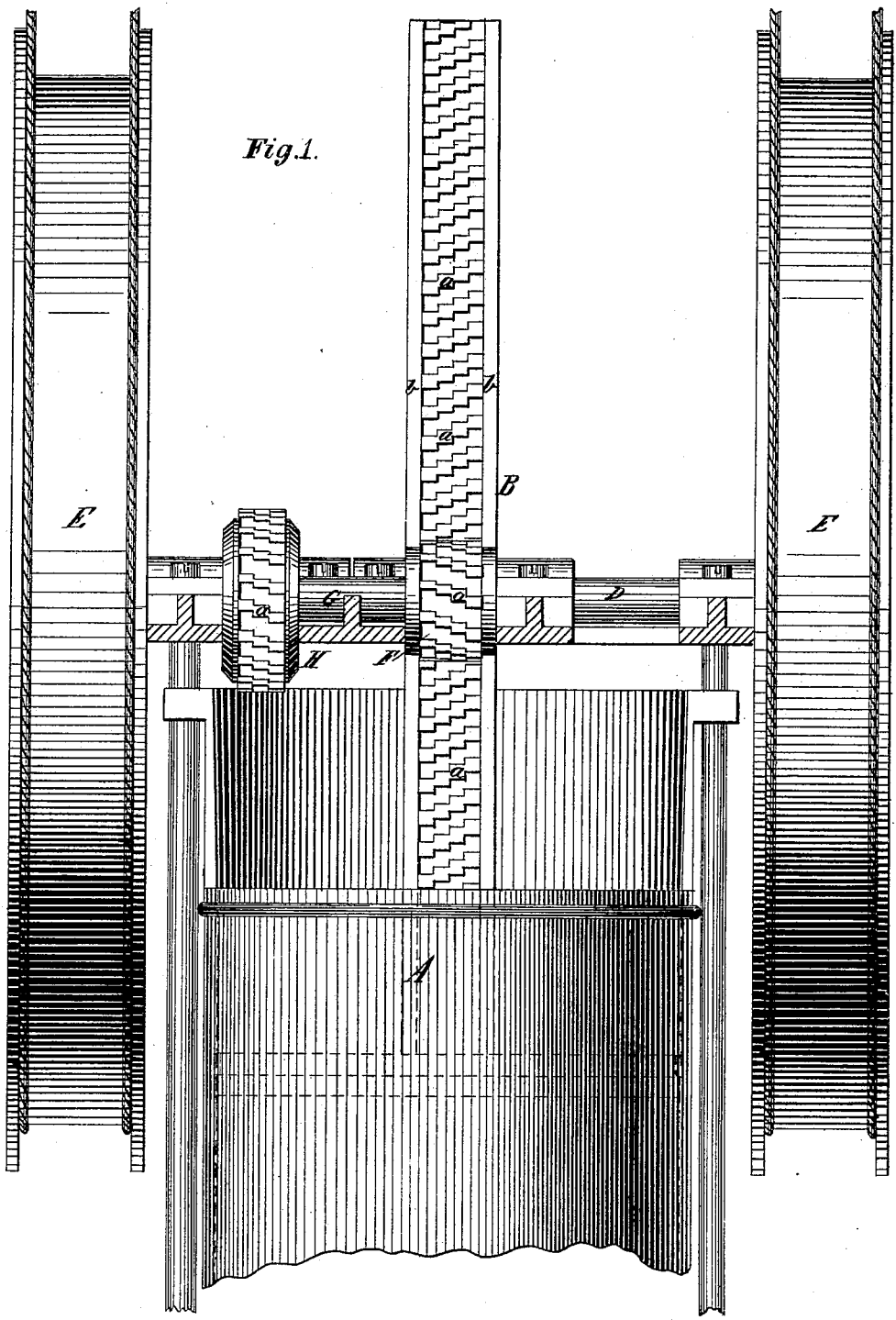

A. GRANVILLE.
HYDRAULIC ELEVATOR.

No. 262,290.  
2 Sheets—Sheet 2.  
Patented Aug. 8, 1882.

Witnesses:  
Thomas E. Grossman  
Chas. F. Flinn

Inventor:  
Arthur Granville  
per James A. Whitney  
Atty.

UNITED STATES PATENT OFFICE.

ARTHUR GRANVILLE, OF NEW YORK, N. Y.

HYDRAULIC ELEVATOR.

SPECIFICATION forming part of Letters Patent No. 262,290, dated August 8, 1882.

Application filed June 2, 1882. (No model.)

*To all whom it may concern:*

Be it known that I, ARTHUR GRANVILLE, of the city, county, and State of New York, have invented certain Improvements in Hydraulic Elevators, of which the following is a specification.

This invention relates to that class of hydraulic elevators in which a reciprocating rack actuated from a hydraulic cylinder gives motion through suitable intermediate gearing to the winding-drums by which the car or cage is operated.

The object of my said invention is to give increased strength and stability to the aforesaid rack and the adjacent and co-operative parts, and to secure continuous and smooth motion to the moving parts. My invention comprises a novel combination of parts whereby this result is very effectually secured.

Figure 3:
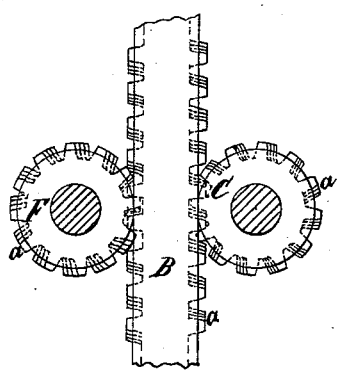
Figure 2:
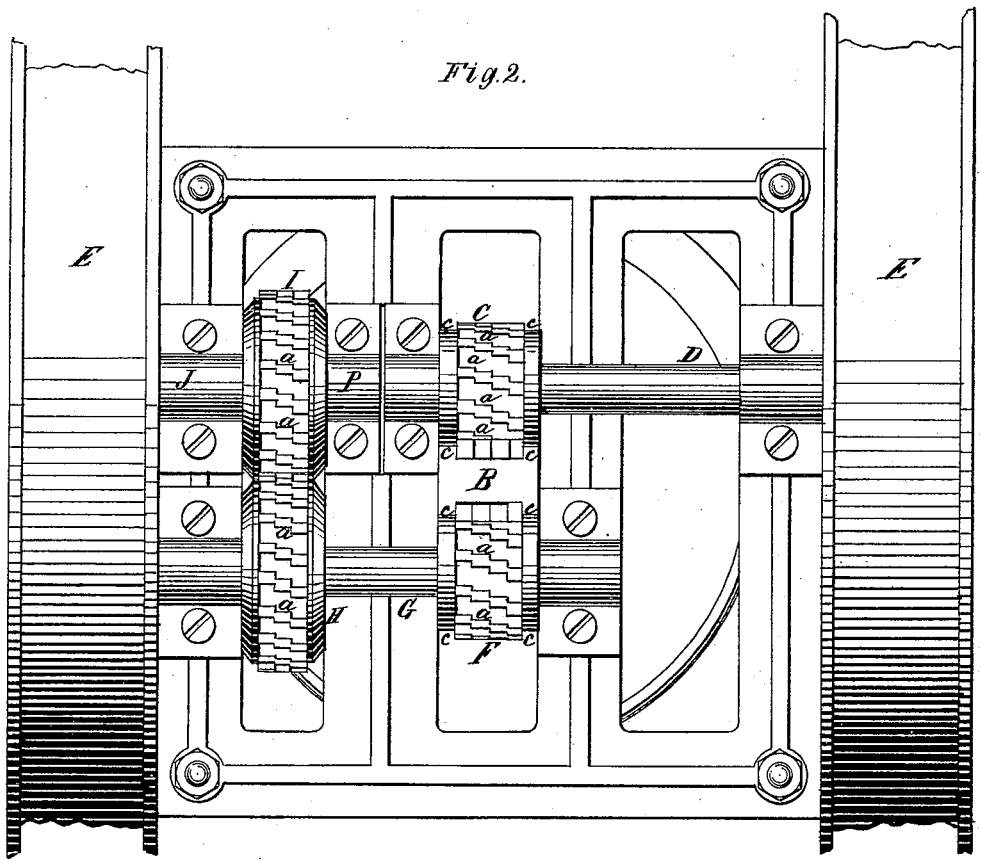

Figure 1 is a side elevation and partial sectional view of an apparatus embracing my said invention. Fig. 2 is a plan view of the same, and Fig. 3 is a detail view of certain parts of the apparatus.

A is the hydraulic cylinder, fitted with the usual or any suitable piston, to which is attached the double rack B. This rack B gears, as hereinafter explained, with a gear-wheel, C, on the shaft D of one of the winding-drums E. The opposite side of said rack B gears with another gear-wheel, F, on a short shaft, G. The said shaft G has another gear-wheel, H, which in its turn gears into still another gear-wheel, I, on the shaft J, which latter terminates at P of the other winding drum or wheel E. As the rack B is moved upward it causes the rotation of the drums E simultaneously and at a uniform speed in one direction. When the said rack moves downward the simultaneous and equal motion of the said drums is of course reversed. The drums E are connected by the usual hoist or draft ropes, pulleys, &c., with the usual elevator car or cage. The rack B, instead of having its two opposite faces provided with ordinary spur or gear teeth, has its teeth $a$ constructed in the peculiar manner more fully represented in Fig. 1—that is to say, the said teeth are constructed each with a series of steps so arranged that the edge of each tooth at the pitch-line intersects the center of the next adjoining tooth without any intervening web, and so on through the several steps of which each tooth is composed. As represented in the drawings, each face of the rack has its teeth made each of four steps. As shown in Fig. 1, the gear-wheels C and F have their teeth likewise made in four steps, corresponding to the teeth of the rack B, and gearing into the said teeth of the rack. From this construction it follows that four teeth of each of the gears C and F are always in contact or gearing with the adjacent toothed side of the rack B. The said rack B is at each side rabbeted at its opposite edges, as shown at $b$. Each of the gears C and F has at its ends cylindrical flat-faced shoulders $c$, which, so to speak, constitute rollers which bear upon the flat surfaces of the rabbets $b$, so that the contact of the surfaces $c$ with the surfaces $b$ insures great smoothness and steadiness in the mutual movement of the gears C and F and of the rack B; and this, combined with the peculiar step-like form of the teeth of the opposite faces of the said rack and of the teeth of the said gears, insures a strong and stable connection of the gears with the rack, and also a smooth movement of the said parts in relation to each other, which adds very materially to the safety, durability, and easy running of the elevator apparatus. So far as concerns the question of strength, moreover, this, as relates to the apparatus considered as a whole, is promoted by the step-like form and character of the teeth of the gears H and I, inasmuch as a number of teeth proportioned to the number of steps in the tooth are always in contact—as, for example, as represented in the drawings, gears H and I, the teeth of which have three steps, and consequently three teeth of the one of said gears are always in contact with and holding upon three teeth of the other of said gears, so that by this means the danger which would result from the breakage of a single tooth when ordinary gearing is used is in the apparatus constructed according to my invention entirely obviated.

It will be observed that the double rack having the step-like teeth, as aforesaid, is cast in one piece, without any ribs intervening between the several steps of the teeth, by which means I economize space and obtain greater strength in proportion to the size than if longitudinal ribs were provided upon the rack and between the steps of the teeth. In like manner, the step-like teeth of the gears are devoid of intervening ribs; and said gears, together with their step-like teeth aforesaid, are each cast in one solid piece, thereby securing like advantages in the gears as in the rack.

What I claim as my invention is—

1. The combination, with the winding-drums, the cylinder, and piston of a hydraulic apparatus, of the double-faced rack B, constructed with teeth having the step-like shape herein described, and having the flat rabbet $b$, and the gears C and F, constructed with similar teeth, and having the flat cylindrical or roller portions $c$, the whole arranged for joint use and operation, substantially as and for the purpose herein set forth.

2. The organized apparatus comprising the hydraulic cylinder A, the double-faced rabbeted rack B, constructed with the step-like teeth, the shafts D and G, carrying the gears C and F, each constructed with the step-like teeth, and having the cylindrical flat-faced or roller-like portions $c$, the gears H and I, having the step-like teeth and placed upon the shafts G and J, and the winding-drums E, the said parts being constructed, combined, and arranged with reference to each other substantially as and for the purpose herein set forth.

ARTHUR GRANVILLE.

Witnesses:
THOMAS E. CROSSMAN,
CHAS. R. BLINN.